(12) United States Patent
Bihday et al.

(10) Patent No.: US 12,092,651 B2
(45) Date of Patent: Sep. 17, 2024

(54) HYDROMETER DEVICE

(71) Applicant: Cypress Semiconductor Corporation, San Jose, CA (US)

(72) Inventors: Volodymyr Bihday, Lviv (UA); Oleg Kapshii, Lviv (UA); Mykhaylo Krekhovetskyy, Lviv (UA); Andriy Maharyta, Lviv (UA); Vasyl Mandziy, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 95 days.

(21) Appl. No.: 17/716,644

(22) Filed: Apr. 8, 2022

(65) Prior Publication Data
US 2023/0324269 A1    Oct. 12, 2023

(51) Int. Cl.
*G01N 9/14* (2006.01)
*G01N 9/12* (2006.01)
*G01N 9/18* (2006.01)
*G01N 9/36* (2006.01)

(52) U.S. Cl.
CPC .............. *G01N 9/14* (2013.01); *G01N 9/12* (2013.01); *G01N 9/18* (2013.01); *G01N 9/36* (2013.01)

(58) Field of Classification Search
CPC .. G01N 9/12; G01N 9/18; G01N 9/14; G01N 9/16; G01N 9/36
See application file for complete search history.

(56) References Cited

U.S. PATENT DOCUMENTS

| | | | |
|---|---|---|---|
| 10,564,025 B2 * | 2/2020 | Oldfield | G01F 23/268 |
| 2005/0092058 A1 * | 5/2005 | Ellson | G01N 29/22 |
| | | | 73/1.82 |
| 2014/0129038 A1 * | 5/2014 | Finnell | B67D 7/32 |
| | | | 700/282 |
| 2017/0197596 A1 * | 7/2017 | Barnes | F01M 11/10 |
| 2019/0170722 A1 * | 6/2019 | Stefanon | G01N 33/22 |
| 2022/0194829 A1 * | 6/2022 | Perrier | C12M 41/42 |
| 2022/0412912 A1 * | 12/2022 | Zambon | G01N 27/221 |

* cited by examiner

*Primary Examiner* — Paul M. West

(57) ABSTRACT

A hydrometer device according to an example includes a floating waterproof device container, and a liquid level sensor positioned in the device container to sense an immersion level of the device container when the device container is floating in a container of liquid. The hydrometer device further includes a conversion circuit positioned in the device container to convert the sensed immersion level to a digital value, and a controller positioned in the device container to determine a liquid density value for the liquid based on the digital value.

14 Claims, 7 Drawing Sheets

HYDROMETER DEVICE

BACKGROUND

There is a growing market for liquid level and property sensing in automotive, Internet of Things (IoT), and consumer spaces. For example, some applications for liquid level and liquid property sensing can involve windshield-washing fluid, fuel level sensing, coffee machines, smart sensing in refrigerators, or the like. Many of these applications may involve non-contact sensing.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Original equipment manufacturers (OEMs) may want to know the composition of liquids contained inside of automobile tanks. This knowledge may help prevent negative consequences that may arise from filling a tank with a wrong type of liquid (e.g., filling a tank with gasoline rather than diesel, or filling a tank with water instead of AdBlue). Similar issues may arise in many other types of applications outside of the automobile industry, including refrigerators, washing machines, and almost any other application that involves a liquid. An ultrasonic method may be used to help classify a liquid based on different speeds of sound, but such a method may have difficulty in differentiating some types of liquids (e.g., summer and winter windscreen washer fluids or in case of liquid freezing). An electrical property method may also be used to help classify a liquid based on different relative permittivity, for example, but conductivity (ion concentration) affects impedance, and such a method may have difficulty in differentiating some types of liquids (e.g., diesel and gasoline). Many types of liquids have different densities (e.g., AdBlue (Diesel Exhaust Fluid or DEF) with a density of 1090 kg/m$^3$; water/summer windscreen washer fluid with a density of 1000 kg/m$^3$; winter washer fluid with a freezing point of −30° C. and a density of 940 kg/m$^3$, winter washer concentrate with a freezing point of −80° C. and a density of 830 kg/m$^3$, diesel fuel with a density of 830 kg/m$^3$, and gasoline with a density of 750 kg/m$^3$.

Some examples disclosed herein perform a liquid classification based on a sensed density of a liquid. However, since some different types of liquids may have the same or a similar density (e.g., winter washer concentrate with a freezing point of −80° C. and a density of 830 kg/m$^3$, and diesel fuel with a density of 830 kg/m$^3$), other examples may perform a liquid classification based on the sensed density of the liquid, and based on one or more other methods (e.g., ultrasonic method and electrical property method) to provide a more accurate classification.

Figure 1:
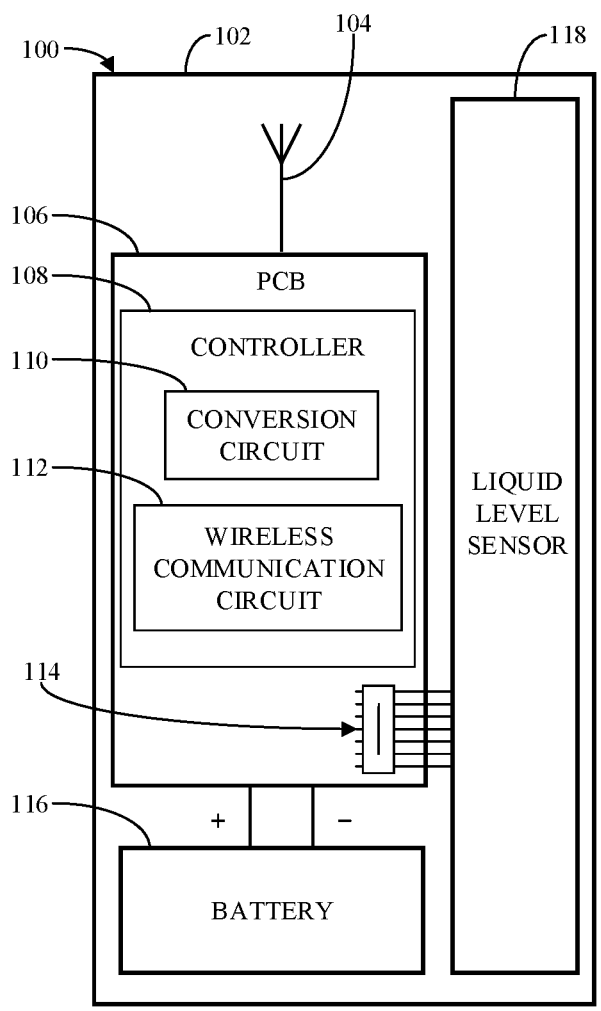
FIG. 1 is a block diagram illustrating a floating hydrometer device according to an example.

FIG. 1 is a block diagram illustrating a floating hydrometer device 100 according to an example. In an example, device 100 floats in a liquid and automatically identifies the density of the liquid and a liquid classification for the liquid (e.g., the type of the liquid, such as gasoline, diesel fuel, water/summer windscreen washer fluid, winter windscreen washer fluid, winter washer concentrate, and AdBlue (DEF)). Hydrometer device 100 includes antenna 104, printed circuit board (PCB) 106, battery 116, and liquid level sensor 118, which are all included inside of a floating waterproof container 102.

Printed circuit board 106 includes controller 108. In an example, controller 108 is a programmable system on a chip (PSoC). Controller 108 includes a conversion circuit 110 and a wireless communication circuit 112. In an example, conversion circuit 110 includes analog to digital conversion circuitry to convert analog signals from liquid level sensor 118 to corresponding digital values that are processed by controller 108. Wireless communication circuit 112 wirelessly sends and receives communications via antenna 104. In an example, wireless communication circuit 112 is a Bluetooth Low Energy (BLE) circuit. PCB 106 is electrically coupled to liquid level sensor 118 via interconnect circuitry 114. Battery 116 provides power to the circuitry on PCB 106.

In an example, liquid level sensor 118 may be a contactless liquid level sensor. The contactless liquid level sensor may be a segmented capacitive liquid level sensor, a single (continuous) capacitive liquid level sensor, a ratiometric capacitive liquid level sensor, or another type of liquid level sensor. In an example, liquid level sensor 118 is to sense an immersion level of the device 100. Device 100 may also include one or more other sensors to perform other sensing functions, such as a level of liquid in a container, and those sensors may include an ultrasonic sensor, a magnetic sensor, or a mechanical switch (e.g., to sense when the device 100 reaches the bottom of a container of liquid).

Figure 2:
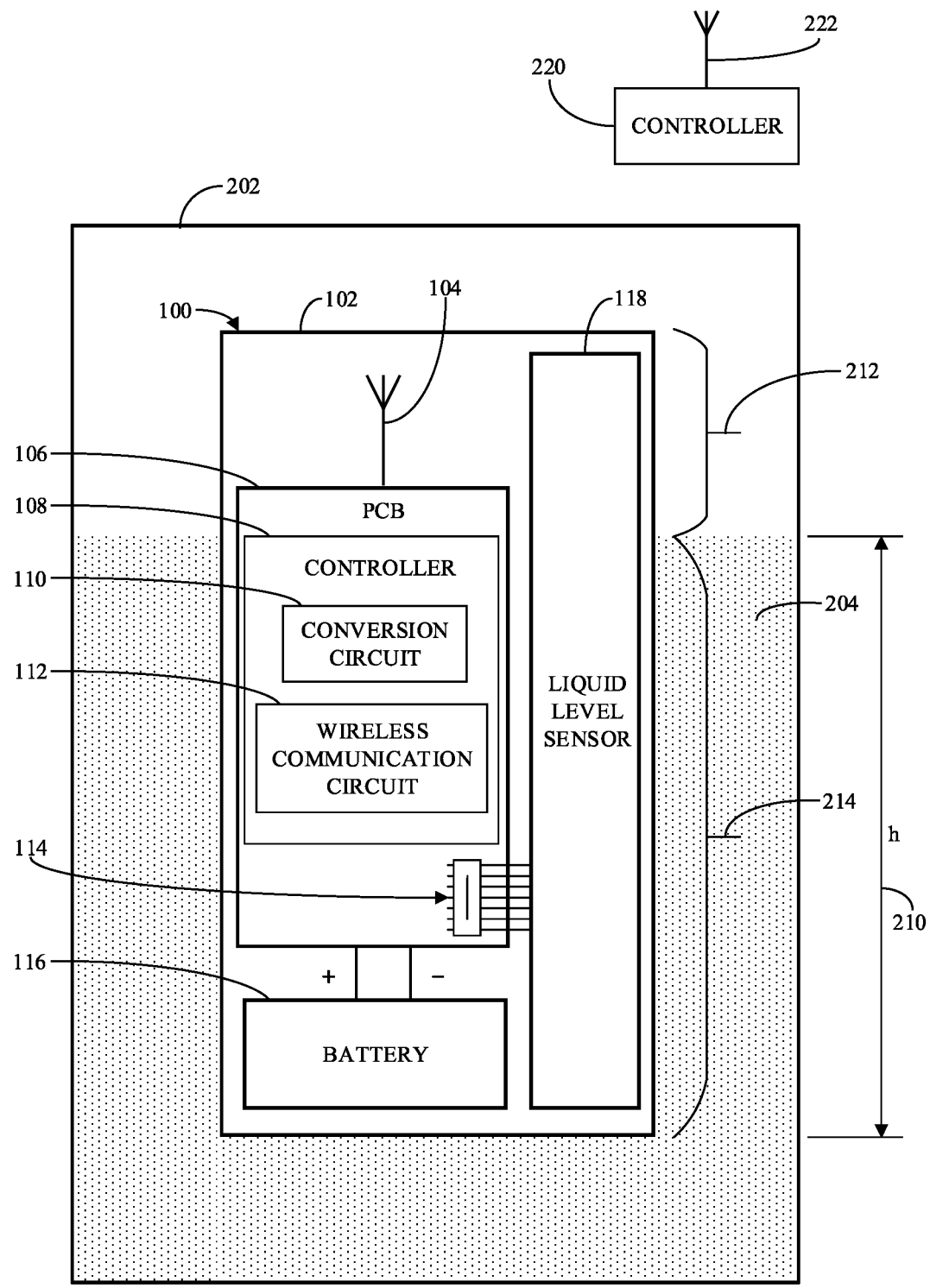
FIG. 2 is a block diagram illustrating the floating hydrometer device shown in FIG. 1 floating in a container of liquid according to an example.

FIG. 2 is a block diagram illustrating the floating hydrometer device 100 shown in FIG. 1 floating in a container 202 of liquid 204 according to an example. As shown in FIG. 2, a lower portion 214 of the device 100 is submerged below the top surface of the liquid 204 as the device 100 floats in an equilibrium state, and an upper portion 212 of the device 100 remains positioned above the surface of the liquid 204. The height (h) 210 represents the height of the portion of the device 100 that is submerged below the surface of the liquid 204, and may also be referred to herein as the immersion level. The liquid level sensor 118 senses the value of the height 210, and provides analog signals representative of the height 210 to conversion circuit 110 via interconnect circuitry 114. Conversion circuit 110 converts the analog signals representative of the height 210 to a digital height value, h, which is provided to controller 108. In an example, controller 108 determines a digital liquid density value, ρ, for the liquid 204, based on the sensed digital height value, h, using the following Equation I:

$$\rho = m/(hS) \quad \text{Equation I}$$

Where:
 ρ=liquid density of liquid 204;
 m=known mass of device 100;
 h=sensed height of the portion of device 100 that is submerged in liquid 204; and
 S=cross-sectional area of a horizontal cut (i.e., perpendicular to the page of FIG. 2) of device 100.

Gravity provides a downward force on device 100 that may be represented by a downward pointing vector that has a magnitude of mg (i.e., mass, m, times gravitational field strength, g). The liquid 204 provides an upward force on device 100 that may be represented by an upward pointing vector with a magnitude of ρghS (i.e., liquid density, ρ, times gravitational field strength, g, times height, h, times cross-sectional area, S). When device 100 is floating in equilibrium with no other forces applied, the magnitude of the upward pointing vector equals the magnitude of the downward pointing vector, which allows Equation I to be determined.

After controller 108 determines the digital liquid density value, ρ, for the liquid 204, controller 108 may use wireless communication circuit 112 and antenna 104 to wireless transmit the digital liquid density value, ρ, to a controller 220. In an example, controller 220 is located outside of the container 202 and remotely from device 100, and includes an antenna 222 for wireless communications with device 100. In an example, controller 108 or controller 120 may determine a liquid classification for the liquid 204 that indicates a liquid type for the liquid 204 based on the digital liquid density value, ρ. Controller 108 may use a lookup table, for example, that associates liquid density values or ranges with various types of liquids. In examples where controller 108 determines the liquid classification, controller 108 may use wireless communication circuit 112 and antenna 104 to wireless transmit the liquid classification to controller 220. In addition to using the liquid density value, ρ, controller 108 or controller 220 may use one or more additional methods in determining the liquid classification for liquid 204, such as an ultrasonic method to measure a speed of sound through the liquid 204 and/or an acoustic impedance of the liquid 204, and/or an electrical property method to measure an electrical property (e.g., impedance) of the liquid 204.

Controller 220 may take various actions depending on the digital liquid density value, ρ, and/or the liquid classification for liquid 204. For example, if the liquid density value and/or the liquid classification for the liquid 204 indicate that it is the wrong type of fluid to be used in container 202, controller 220 may generate a visual and/or audible warning signal to alert a user. Controller 220 may also include a display device to display the digital liquid density value, ρ, and/or the liquid classification for liquid 204.

Figure 3:
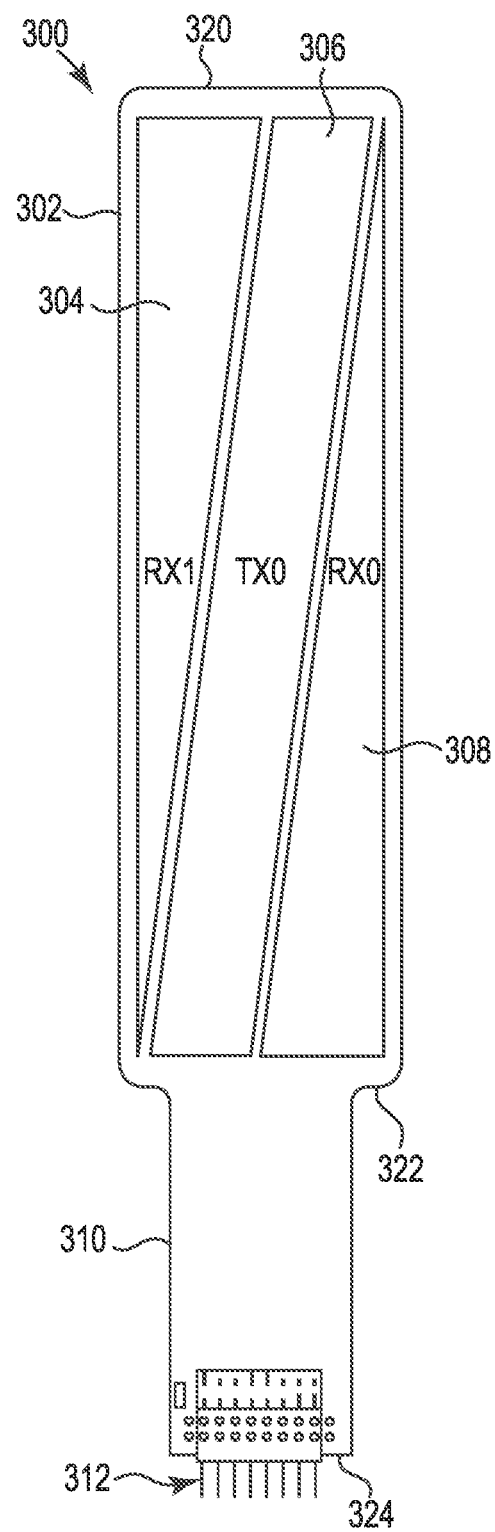
FIG. 3 is a diagram illustrating a single continuous capacitive liquid level sensor according to an example.

Liquid level sensor 118 may be implemented with a variety of different types of contactless capacitive sensors, such as those shown in FIGS. 3-5 and described below. FIG. 3 is a diagram illustrating a single continuous capacitive liquid level sensor 300 according to an example. Sensor 300 is an example implementation of liquid level sensor 118 (FIG. 1). Sensor 300 includes a sensing region 302 and an interconnect region 310. Sensing region 302 extends longitudinally between a proximal end 322 and a distal end 320. A receive electrode (RX1) 304 is positioned adjacent a left edge of the sensing region 302, and extends from about the proximal end 322 to the distal end 320. A receive electrode (RX0) 308 is positioned adjacent a right edge of the sensing region 302, and extends from about the proximal end 322 to the distal end 320. A transmit electrode (TX0) 306 is positioned between the receive electrodes 304 and 308, and extends from about the proximal end 322 to the distal end 320.

Interconnect region 310 extends from the proximal end 322 of the sensing region 302 to a proximal end 324 of the region 310. Interconnect circuitry 312 is positioned at the proximal end 324 of the interconnection region 310. Interconnect circuitry 312 is an example implementation of interconnect circuitry 114 (FIG. 1).

Excitation voltage signals may be sent from conversion circuit 110 (FIG. 1) to interconnect circuitry 312 and applied to transmit electrode 306, and capacitive charges received from the receive electrodes 304 and 308 may be transferred through interconnect circuitry 312 to conversion circuit 110. The conversion circuit 110 may convert the received capacitive charges to digital values, which may be processed by controller 108 to determine the immersion level, h, of the device 100.

Figure 4:
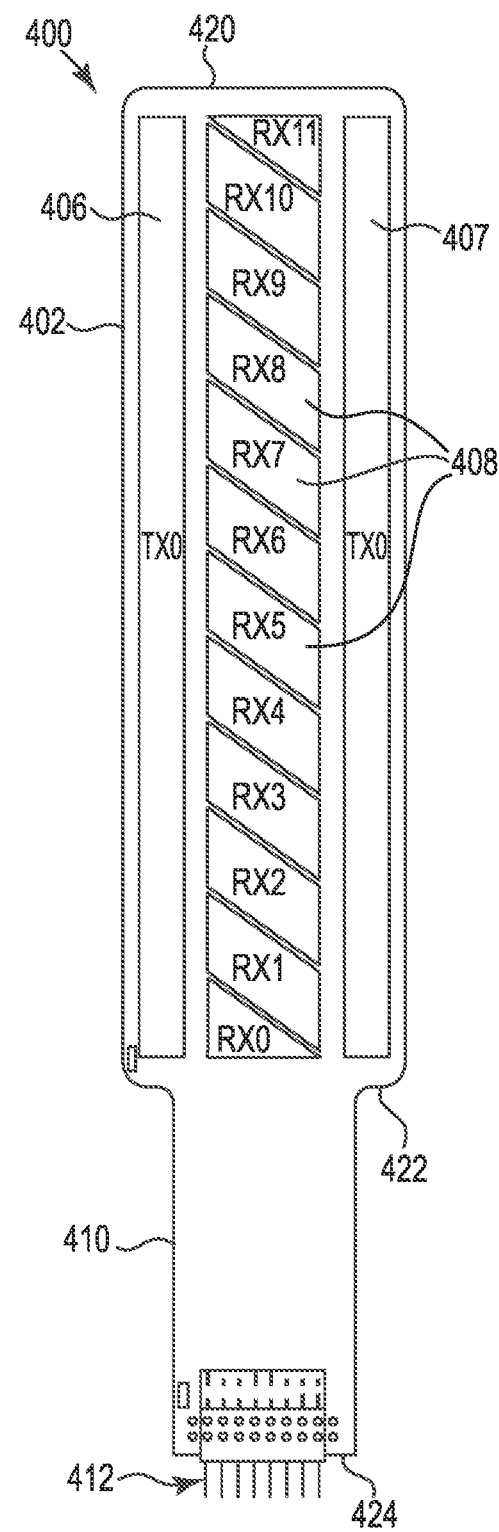
FIG. 4 is a diagram illustrating a segmented capacitive liquid level sensor according to an example.

FIG. 4 is a diagram illustrating a segmented capacitive liquid level sensor 400 according to an example. Sensor 400 is an example implementation of liquid level sensor 118 (FIG. 1). Sensor 400 includes a sensing region 402 and an interconnect region 410. Sensing region 402 extends longitudinally between a proximal end 422 and a distal end 420. A transmit electrode (TX0) 406 is positioned adjacent a left edge of the sensing region 402, and extends from about the proximal end 422 to the distal end 420. A transmit electrode (TX0) 407 is positioned adjacent a right edge of the sensing region 402, and extends from about the proximal end 422 to the distal end 420. A plurality (e.g., 12) of receive electrodes (RX0-RX11) 408 are longitudinally aligned and positioned between the transmit electrodes 406 and 407. The plurality of receive electrodes 408 extends from about the proximal end 422 to the distal end 420.

Interconnect region 410 extends from the proximal end 422 of the sensing region 402 to a proximal end 424 of the region 410. Interconnect circuitry 412 is positioned at the proximal end 424 of the interconnection region 410. Interconnect circuitry 412 is an example implementation of interconnect circuitry 114 (FIG. 1).

Excitation voltage signals may be sent from conversion circuit 110 (FIG. 1) to interconnect circuitry 412 and applied to transmit electrodes 406 and 407, and capacitive charges received from the receive electrodes 408 may be transferred through interconnect circuitry 412 to conversion circuit 110. The conversion circuit 110 may convert the received capacitive charges to digital values, which may be processed by controller 108 to determine the immersion level, h, of the device 100. The sensors 300/400 shown in FIG. 3 and FIG. 4 measure mutual capacitance between two adjacent conductors. The same sensors 300/400 can measure self capacitance between the conductor and ground.

Figure 5:
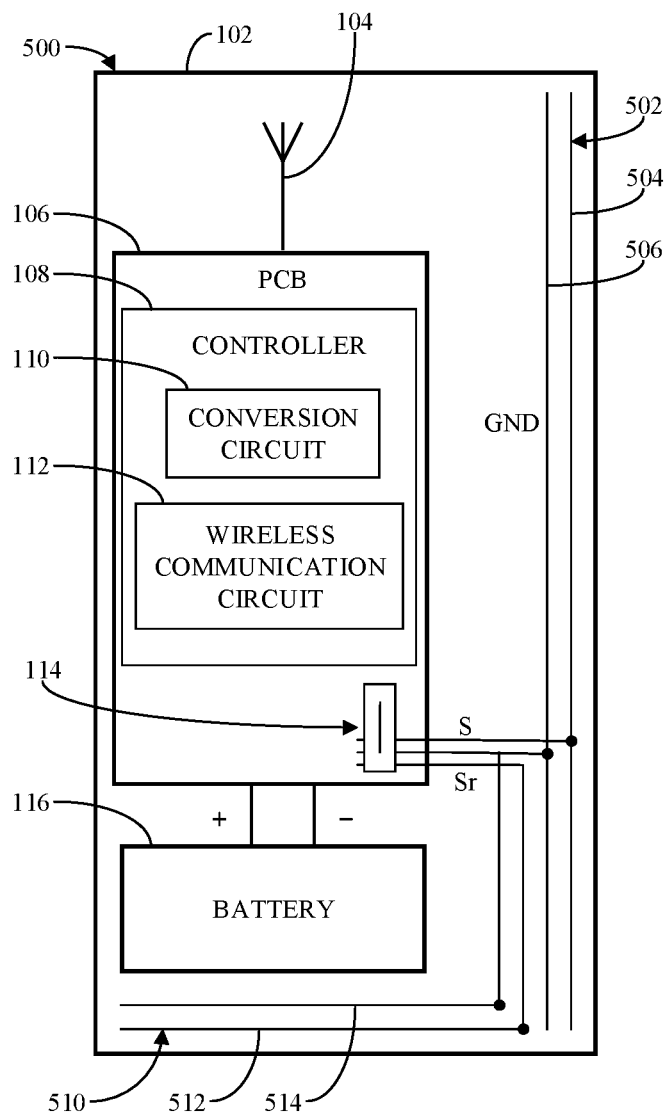
FIG. 5 is a block diagram illustrating a floating hydrometer device according to another example.

FIG. 5 is a block diagram illustrating a floating hydrometer device 500 according to another example. The example hydrometer device 500 shown in FIG. 5 includes the same elements as hydrometer device 100 (FIG. 1), but the liquid level sensor 118 of device 100 is shown in FIG. 5 as a ratiometric capacitive liquid level sensor 502. Sensor 502 includes a reference sensor portion 510 and a liquid level sensor portion 502. Reference sensor portion 510 includes a sensor electrode 512 and a ground electrode 514, which are both adjacent to a bottom end of the device 100 and extend horizontally across almost an entire width of the device 500. Sensor electrode 512 and ground electrode 514 are connected to interconnect circuitry 114. Sensor electrode 512 provides a reference signal, Sr, and ground electrode 514 provides a ground signal, GND, to interconnect circuitry 114.

Liquid level sensor portion 502 includes a sensor electrode 504 and a ground electrode 506, which are both adjacent a right end of the device and extend vertically across almost an entire height of the device 500. Sensor electrode 504 and ground electrode 506 are connected to interconnect circuitry 114. Sensor electrode 504 provides a sensor signal, S, and ground electrode 506 provides a ground signal, GND, to interconnect circuitry 114.

The ratiometric capacitive liquid level sensor 502 provides analog signals representative of the immersion level of device 500 to conversion circuit 110 via interconnect circuitry 114. Conversion circuit 110 converts the analog signals to a digital height or immersion level value, h, which is provided to controller 108. The immersion level, h, of the device 500 may be determined using the following Equation II:

$$h = k(C_S - C_{S0})/(C_{Sr} - C_{Sr0})$$ Equation II

Where:
  h=immersion level;
  k=coefficient;
  $C_S$=capacitance between S and GND;
  $C_{Sr}$=capacitance between Sr and GND;
  $C_{S0}$=capacitance between S and GND during calibration;
  $C_{Sr0}$=capacitance between Sr and GND during calibration;

In an example, controller 108 determines a digital liquid density value, ρ, for the liquid, based on the sensed digital immersion level value, h, using Equation I above. After controller 108 determines the digital liquid density value, ρ, for the liquid, controller 108 may use wireless communication circuit 112 and antenna 104 to wireless transmit the digital liquid density value, ρ, to a second controller located outside of the container 102. In an example, controller 108 (or the second controller) may determine a liquid classification for the liquid that indicates a liquid type for the liquid based on the digital liquid density value, ρ. Controller 108 may use a lookup table, for example, that associates liquid density values or ranges with various types of liquids. In examples where controller 108 determines the liquid classification, controller 108 may use wireless communication circuit 112 and antenna 104 to wireless transmit the liquid classification to second controller. In addition to using the liquid density value, ρ, controller 108 or the second controller may use one or more additional methods in determining the liquid classification, such as an ultrasonic method to measure a speed of sound through the liquid and/or an acoustic impedance of the liquid, and/or an electrical property method to measure an electrical property (e.g., impedance) of the liquid.

6A is a diagram illustrating a front side view of a hydrometer device 600 positioned in a container 602 of liquid 604 according to another example. Hydrometer device 600 includes sensing structure 606, float 608, and controller 610. Sensing structure 606 extends vertically from a bottom of the container 602 to a top of the container 602. Interconnect circuitry 609 is positioned at a bottom of the sensing structure 606 and extends through the bottom of the container 602 to interconnect the sensing structure 606 to the controller 610. The front side of the sensing structure 606 includes a capacitive liquid level sensor 607 that extends vertically from bottom of the structure 606 to a top of the structure 606 and senses the liquid level of liquid 604.

In an example, float 608 is a donut-shaped float that is wrapped around the sensing structure 606. The density of the float 608 is less than the density of the liquid 604, and the float 608 floats on the top surface of the liquid 604. The float 608 moves vertically upward and downward with the level of the liquid 604 guided by the sensing structure 606. As the level of the liquid 604 increases, the float 608 moves vertically upward along the sensing structure 606. As the level of the liquid 604 decreases, the float 608 moves vertically downward along the sensing structure 606.

Figure 6B:
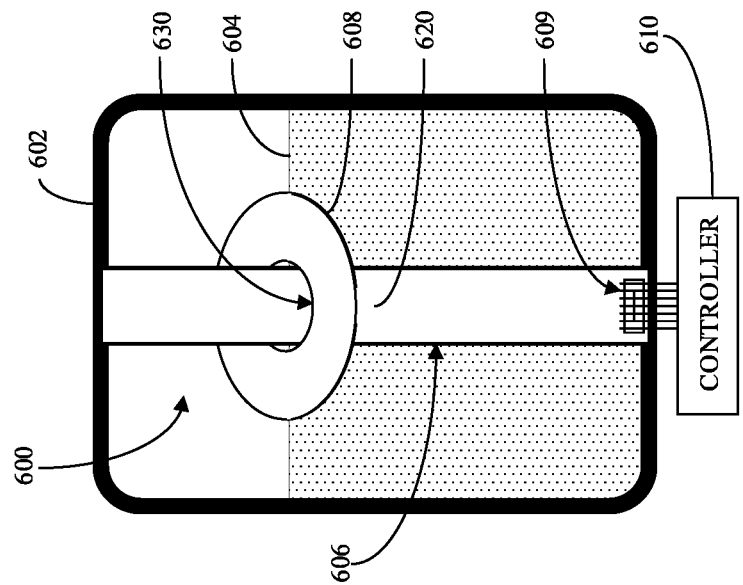
FIG. 6B is a diagram illustrating a back side view of the hydrometer device shown in FIG. 6A according to an example.
Figure 6A:
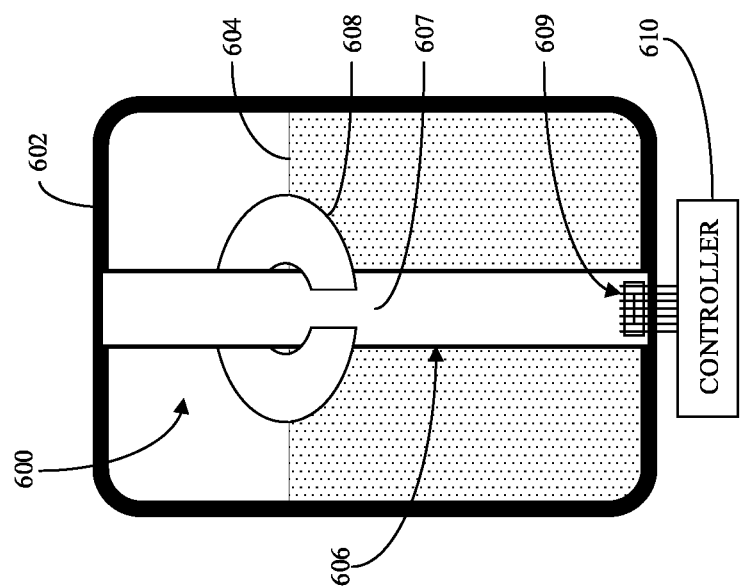
FIG. 6A is a diagram illustrating a front side view of a hydrometer device positioned in a container of liquid according to another example.
Figure 6C:
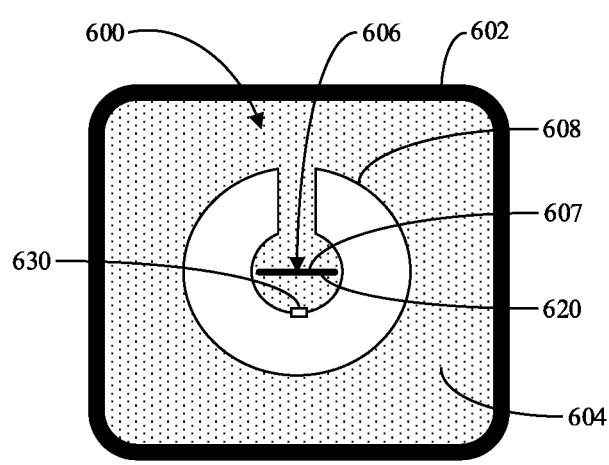
FIG. 6C is a diagram illustrating a top view of the hydrometer device shown in FIG. 6A according to an example.

FIG. 6B is a diagram illustrating a back side view of the hydrometer device 600 shown in FIG. 6A according to an example. FIG. 6C is a diagram illustrating a top view of the hydrometer device 600 shown in FIG. 6A according to an example. As shown in FIG. 6B, the back side of the sensing structure 606 includes an inductive sensor 620 that extends vertically from a bottom of the structure 606 to a top of the structure 606. As shown in FIG. 6C, the float 608 includes magnetic material 630 positioned on an inner portion of the float 608 adjacent to the inductive sensor 620 that interacts with the inductive sensor 620.

Capacitive sensor 607 and inductive sensor 620 may each provide sensor signals to controller 610 via interconnect circuitry 609. The difference between the capacitive and inductive sensor results is inversely proportional to the liquid density of liquid 604, so the controller 610 may determine the liquid density of liquid 604 based on the received sensor signals. In other examples, the capacitive sensor 606 and the inductive sensor 620 may be positioned outside of the container 602.

After controller 610 determines the liquid density value, ρ, for the liquid 604, controller 610 may use wired or wireless communications to transmit the liquid density value, ρ, to a second controller. In an example, controller 610 or the second controller may determine a liquid classification for the liquid 604 that indicates a liquid type for the liquid 604 based on the liquid density value, p. In examples where controller 610 determines the liquid classification, controller 610 may use wired or wireless communications to transmit the liquid classification to the second controller. In addition to using the liquid density value, ρ, controller 610 or the second controller may use one or more additional methods in determining the liquid classification, such as an ultrasonic method to measure a speed of sound through the liquid and/or an acoustic impedance of the liquid, and/or an electrical property method to measure an electrical property (e.g., impedance) of the liquid.

Figure 7:
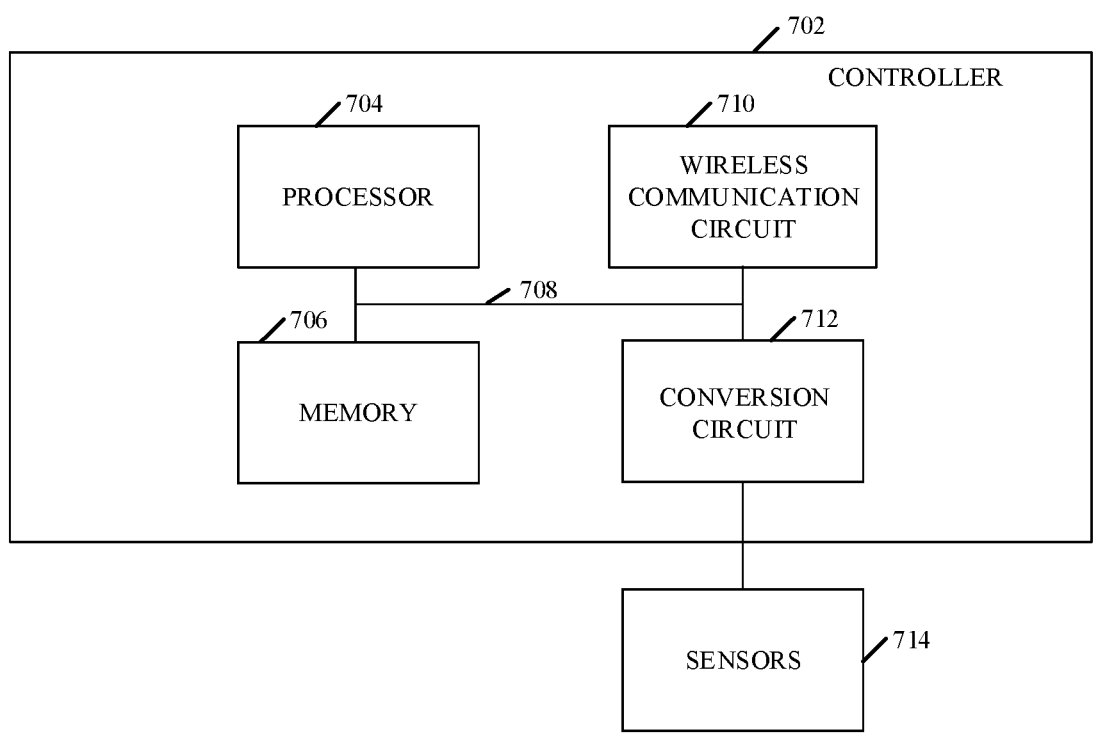
FIG. 7 is a block diagram illustrating a controller according to an example.

FIG. 7 is a block diagram illustrating a controller 702 according to an example. Any of the controllers disclosed herein, such as controllers 108, 220, and 610, may be implemented as shown in FIG. 7. In an example, controller 702 is a microcontroller system that may include application-specific integrated circuits (ASICs), field-programmable gate arrays (FPGAs), application processors, digital signal processors (DSPs), networking controllers, video and audio controllers, graphics processing units, digital components such as timers and input/outputs ("I/Os"), analog components such as analog-to-digital converters ("ADC") and analog comparators, communication interfaces, clock sources such as a crystal oscillator, timers such as a real time clock ("RTC"), and the like. Among other components (not shown in FIG. 7), controller 702 includes processor 704, memory 706, wireless communication circuit 710, and conversion circuit 712. Wireless communication circuit 710 is an example of wireless communication circuit 112 (FIG. 1). Conversion circuit 712 is an example of conversion circuit 110 (FIG. 1). In the illustrated example, processor 704, memory 706, wireless communication circuit 710, and conversion circuit 712 are communicatively coupled to each other via communication link 708, which may be an internal communication bus. It is noted that various implementations and embodiments may use different components or combinations of components to perform the operations described herein.

Processor 704 includes a central processing unit (CPU) or another suitable processor. In one example, memory 706 stores machine readable instructions executed by processor 704 for operating the controller 702. Memory 706 includes any suitable combination of volatile and/or non-volatile memory, such as combinations of Random Access Memory (RAM), Read-Only Memory (ROM), flash memory, and/or other suitable memory. These are examples of non-transitory computer readable storage media. Memory 706 is non-transitory in the sense that it does not encompass a transitory signal but instead is made up of at least one memory component to store machine executable instructions for performing techniques described herein.

In an example, conversion circuit 712 is coupled to sensors 714. Sensors 714 may include any of the sensors disclosed herein and/or other types of sensors. Conversion circuit 712 performs various conversions (e.g., analog-to-digital and digital-to-analog) to facilitate communication between processor 704 and sensors 714.

In an example, the various subcomponents or elements of the controller 702 may be embodied in a plurality of different systems, where different modules may be grouped or distributed across the plurality of different systems. To achieve its desired functionality, controller 702 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Some examples of devices disclosed herein are easy to mount, and do not involve wiring, gluing, or mounting holes. The deposition of substances on the outer walls of the device 100 or device 500 during operation may interfere with the functioning of these devices. To address this issue, device 100 or device 500 may include sensors to detect deposition events, and/or an oleophobic plastic cover may be used for these devices. Techniques disclosed herein may be combined with other techniques, such as contactless measurement of liquid electrical characteristics for higher accuracy liquid composition measurement and liquid classification. By knowing or measuring certain liquid properties (e.g., liquid density and relative permittivity) using techniques disclosed herein, other properties (e.g., freezing point) and concentrations of liquid mixture constituents may be determined. Techniques disclosed herein may be used in automotive applications, as well as any other industrial or consumer field where various liquids are used.

An example of the present disclosure is directed to a hydrometer device, which includes a floating waterproof device container, and a liquid level sensor positioned in the device container to sense an immersion level of the device container when the device container is floating in a container of liquid. The hydrometer device further includes a conversion circuit positioned in the device container to convert the sensed immersion level to a digital value, and a controller positioned in the device container to determine a liquid density value for the liquid based on the digital value.

The hydrometer device may include a wireless communication circuit positioned in the device container to wirelessly transmit the liquid density value to a controller located outside of the container of liquid. The controller may determine a liquid classification for the liquid based on the digital value. The hydrometer device may include a wireless communication circuit positioned in the device container to wirelessly transmit the liquid classification to a controller located outside of the container of liquid.

The liquid level sensor may be a capacitive liquid level sensor. The capacitive liquid level sensor may be a continuous capacitive liquid level sensor with at least one electrode that extends along substantially an entire length of the liquid level sensor. The capacitive liquid level sensor may be a segmented capacitive liquid level sensor with a plurality of segmented electrodes that are distributed along substantially an entire length of the liquid level sensor. The capacitive liquid level sensor may be a ratiometric capacitive liquid level sensor. The ratiometric capacitive liquid level sensor may include a vertically oriented capacitive liquid level sensor and a horizontally oriented capacitive reference sensor.

The hydrometer device may further include a sensor to sense an electrical property of the liquid, and the controller may determine a liquid classification for the liquid based on the digital value and the sensed electrical property. The hydrometer device may further include a sensor to sense at least one of a speed of sound through the liquid and an acoustic impedance of the liquid, and the controller may determine a liquid classification for the liquid based on the digital value and at least one of the sensed speed of sound through the liquid and the sensed acoustic impedance of the liquid.

Another example of the present disclosure is directed to an automotive system, which includes a fluid container to be positioned in an automobile and hold a fluid to be used by the automobile. The system includes a waterproof device container positioned in the fluid container to float on the fluid. The system includes a capacitive liquid level sensor positioned in the device container to sense an immersion level of the device container. The system includes a controller positioned in the device container, wherein the controller includes a conversion circuit to convert the sensed immersion level to a digital value, wherein the controller is to determine a liquid density value for the liquid based on the digital value, and wherein the controller is to cause information regarding the liquid to be wirelessly transmitted to a control device in the automobile that is located outside of the fluid container.

The controller may determine a liquid classification for the liquid based on the digital value. The wirelessly transmitted information may include at least one of the liquid density value and the liquid classification. The controller may include a wireless communication circuit positioned in the device container to wirelessly transmit at least one of the liquid density value and the liquid classification. The automotive system may further include at least one sensor to sense at least one of an electrical property of the liquid, a speed of sound through the liquid, and an acoustic impedance of the liquid, and the controller may determine a liquid classification for the liquid based on the digital value and at least one of the sensed electrical property, the sensed speed of sound through the liquid, and the sensed acoustic impedance of the liquid.

Another example of the present disclosure is directed to a hydrometer device, which includes a sensor structure to be positioned in a container of liquid, wherein the sensor structure includes a capacitive liquid level sensor on a front side of the sensor structure and an inductive sensor on a back side of the sensor structure. The hydrometer device includes a float structure to float on a top surface of the liquid and move upward and downward along the sensor structure with changes in a level of the liquid in the container, wherein the float includes magnetic material to interact with the inductive sensor. The hydrometer device includes a controller to receive capacitive sensor signals from the capacitive liquid level sensor and inductive sensor signals from the inductive sensor, wherein the controller is to determine a liquid density value for the liquid based on the received signals.

The float structure may be a donut-shaped structure that substantially surrounds the sensor structure. The controller may be positioned outside of the container of liquid. The controller may determine a liquid classification for the liquid based on the liquid density value.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A hydrometer device, comprising:
    a floating waterproof device container;
    a liquid level sensor positioned in the device container to sense an immersion level of the device container when the device container is floating in a container of liquid;
    a conversion circuit positioned in the device container to convert the sensed immersion level to a digital value; and
    a controller positioned in the device container to determine a liquid density value for the liquid based on the digital value,
    wherein the controller is to determine a liquid classification for the liquid based on the digital value, the liquid classification comprising a type of the liquid, and
    wherein the controller is to determine the liquid classification using a lookup table that associates liquid density values or ranges with types of liquids comprising gasoline, diesel fuel, water/summer windscreen washer fluid, winter windscreen washer fluid, winter washer concentrate, and diesel exhaust fluid.

2. The hydrometer device of claim 1, and further comprising:
    a wireless communication circuit positioned in the device container to wirelessly transmit the liquid density value to a controller located outside of the container of liquid.

3. The hydrometer device of claim 1, and further comprising:
    a wireless communication circuit positioned in the device container to wirelessly transmit the liquid classification to a controller located outside of the container of liquid.

4. The hydrometer device of claim 1, wherein the liquid level sensor is a capacitive liquid level sensor.

5. The hydrometer device of claim 4, wherein the capacitive liquid level sensor is a continuous capacitive liquid level sensor with at least one electrode that extends along substantially an entire length of the liquid level sensor.

6. The hydrometer device of claim 4, wherein the capacitive liquid level sensor is a segmented capacitive liquid level sensor with a plurality of segmented electrodes that are distributed along substantially an entire length of the liquid level sensor.

7. The hydrometer device of claim 4, wherein the capacitive liquid level sensor is a ratiometric capacitive liquid level sensor.

8. The hydrometer device of claim 7, wherein the ratiometric capacitive liquid level sensor includes a vertically oriented capacitive liquid level sensor and a horizontally oriented capacitive reference sensor.

9. The hydrometer device of claim 1, and further comprising:
    a sensor to sense an electrical property of the liquid; and
    wherein the controller is to determine the liquid classification for the liquid based on the digital value and the sensed electrical property.

10. The hydrometer device of claim 1, and further comprising:
    a sensor to sense at least one of a speed of sound through the liquid and an acoustic impedance of the liquid; and
    wherein the controller is to determine the liquid classification for the liquid based on the digital value and at least one of the sensed speed of sound through the liquid and the sensed acoustic impedance of the liquid.

11. An automotive system, comprising:
    a fluid container to be positioned in an automobile and hold a fluid to be used by the automobile;
    a waterproof device container positioned in the fluid container to float on the fluid;
    a capacitive liquid level sensor positioned in the device container to sense an immersion level of the device container; and
    a controller positioned in the device container, wherein the controller includes a conversion circuit to convert the sensed immersion level to a digital value, wherein the controller is to determine a liquid density value for the liquid based on the digital value, and wherein the controller is to cause information regarding the liquid to be wirelessly transmitted to a control device in the automobile that is located outside of the fluid container,
    wherein the controller is to determine a liquid classification for the liquid based on the digital value, the liquid classification comprising a type of the liquid, and
    wherein the controller is to determine the liquid classification using a lookup table that associates liquid density values or ranges with types of liquids comprising gasoline, diesel fuel, water/summer windscreen washer fluid, winter windscreen washer fluid, winter washer concentrate, and diesel exhaust fluid.

12. The automotive system of claim 11, wherein the wirelessly transmitted information includes at least one of the liquid density value and the liquid classification.

13. The automotive system of claim 12, wherein the controller includes a wireless communication circuit positioned in the device container to wirelessly transmit at least one of the liquid density value and the liquid classification.

14. The automotive system of claim 11, and further comprising:
   at least one sensor to sense at least one of an electrical property of the liquid, a speed of sound through the liquid, and an acoustic impedance of the liquid; and
   wherein the controller is to determine the liquid classification for the liquid based on the digital value and at least one of the sensed electrical property, the sensed speed of sound through the liquid, and the sensed acoustic impedance of the liquid.

* * * * *